United States Patent
Adami et al.

(10) Patent No.: US 8,714,223 B2
(45) Date of Patent: May 6, 2014

(54) CORRUGATING MACHINE FOR PRODUCING CORRUGATED BOARD AND RELATED METHOD

(75) Inventors: Mauro Adami, Viareggio (IT); Lorenzo Vannucchi, Camaiore (IT)

(73) Assignee: Fosber S.p.A., Pescaglia (LU) (IT)

( * ) Notice: Subject to any disclaimer, the term of this patent is extended or adjusted under 35 U.S.C. 154(b) by 285 days.

(21) Appl. No.: 13/350,042

(22) Filed: Jan. 13, 2012

(65) Prior Publication Data

US 2012/0180955 A1 Jul. 19, 2012

(30) Foreign Application Priority Data

Jan. 17, 2011 (IT) ................. FI2011A0006

(51) Int. Cl.
- B32B 41/00 (2006.01)
- B31F 1/28 (2006.01)
- B29C 65/00 (2006.01)

(52) U.S. Cl.
CPC ............. *B31F 1/2877* (2013.01); *B31F 1/2831* (2013.01); *B31F 1/2863* (2013.01); *B31F 1/2818* (2013.01); *B31F 1/2804* (2013.01); *B31F 1/2813* (2013.01); *B29C 66/438* (2013.01)
USPC ............. 156/358; 156/64; 156/205; 156/210; 156/350; 156/356; 156/378; 156/379

(58) Field of Classification Search
USPC ........... 156/64, 205, 210, 350, 356, 358, 378, 156/379
See application file for complete search history.

(56) References Cited

U.S. PATENT DOCUMENTS

| 4,059,474 A * | 11/1977 | Coburn .................. 156/356 |
| 5,876,530 A | 3/1999 | Seki et al. |
| 6,095,963 A * | 8/2000 | Shaw .................. 493/379 |
| 2007/0248712 A1 | 10/2007 | Adami et al. |

FOREIGN PATENT DOCUMENTS

| DE | 43 05 158 | 8/1994 |
| EP | 1362690 | 11/2003 |
| EP | 1362691 | 11/2003 |

\* cited by examiner

*Primary Examiner* — Katarzyna Wyrozebski Lee
*Assistant Examiner* — Joshel Rivera
(74) *Attorney, Agent, or Firm* — McGlew and Tuttle, P.C.

(57) ABSTRACT

The machine for producing a corrugated board includes a first corrugating roller (3) and a second corrugating roller (5) defining a corrugating nip (7) through which a first web material (N1) passes. A gluing unit (9) applies a glue on crests of the first web material (N1) formed in the corrugating nip (7). A pressing member (11) cooperates with the second corrugating roller (5) to press a second web material (N2) against the crests of the first web material (N1). A pressure regulating system adjusts the pressure of the pressing member (11) against the second corrugating roller (5). At least a first pressure chamber (27C), which contains a pressure liquid and a pressure transducer, is associated with a first abutment (33) for said pressing member (11). A control unit (69) opens a stop valve (39) when the pressure detected by the pressure transducer (37) is outside a tolerance range.

19 Claims, 3 Drawing Sheets

CORRUGATING MACHINE FOR PRODUCING CORRUGATED BOARD AND RELATED METHOD

TECHNICAL FIELD

The present invention relates to the corrugated-board production field. More in particular, the present invention relates to improvements to corrugating machines, so-called single facers, producing the corrugated cardboard components.

STATE OF THE ART

Corrugated board is an article constituted by at least three paper layers, one of which is a corrugated inner layer glued to two smooth outer layers called liners. Corrugated board can have a number of paper layers or sheets greater then three and, more in particular, a generic number N of corrugated sheets and a number N+1 of smooth sheets. Each corrugated sheet is glued between two smooth sheets. This article is produced starting from smooth paper sheets that are fed in pairs into a corrugating machine. Typically, a corrugating machine comprises: a first corrugating roller and a second corrugating roller defining a corrugating nip for corrugating a first web material passing between said first corrugating roller and said second corrugating roller; a gluing unit cooperating with said second corrugating roller to apply glue on the crests of said first web material; a pressing member cooperating with said second corrugating roller to press a second web material against the crests of the first web material; a pressure regulating system to adjust the pressure of the pressing member against said second corrugating roller; an actuator to urge the pressing member against the second corrugating roller; and an abutment defining an adjustable position of said pressing member.

In this way, a semi-finished product is obtained at the exit of the corrugating machine, constituted by a corrugated paper sheet glued, at the crests, to a smooth paper sheet.

EP 1362690, EP 1362691 and U.S. Pat. No. 5,876,530 disclose example of corrugating machines of the type described above.

DE 43 05 158 discloses a corrugating machine, or single facer, of the type indicated above, wherein a continuous pressure regulating system is provided to adjust the pressure exerted by the pressing member against the second corrugating roller so that the smooth sheet adheres to the corrugated sheet. This pressure regulating system is not effective. In particular, the system is unstable.

SUMMARY OF THE INVENTION

The invention provides a corrugating machine, or single facer, of the type described above that overcomes, wholly or partially, one or more of the disadvantages of the prior art machines. The object of a preferred embodiment of the invention is to provide a single facer with a better control of the pressure exerted against the second corrugating roller to bond correctly the smooth and corrugated paper sheets to one another. Substantially, according to the invention the regulating system to adjust the pressure of the pressing member against the second corrugating roller comprises at least a first pressure chamber associated with a first abutment for the pressing member, the pressure chamber containing a pressure liquid and being provided with a first pressure transducer to detect the pressure inside the chamber. A control unit is furthermore provided that causes controlled opening of a first stop valve when the pressure detected by the first pressure transducer is outside a tolerance range around a desired pressure value. The opening of the first stop valve puts the first pressure chamber into fluid connection with a hydraulic circuit for pumping the pressure liquid. In this way, thanks to the fact that the liquid contained in the pressure chamber is substantially incompressible, the abutment acts as a substantially rigid abutment until the stop valve remains closed. When the pressure detected by the transducer is outside the tolerance range around the desired value, the pressure chamber is connected with the hydraulic circuit so as to feed liquid into, or discharge liquid from, said pressure chamber. This causes a change in the pressure chamber and thus a position adjustment of the abutment on which the pressing member rests. As it will be clear from the description of an embodiment of the invention, this movement of the abutment, i.e. this adjustment of its position, changes the force exerted by the pressing member onto the second corrugating roller and thus the pressing force of the two web materials against each other to glue them.

In some advantageous embodiments the pressure chamber can comprise, or can be formed by, a cylinder-piston system. One of the two components of the cylinder-piston is fixed to a rigid support structure, whilst the other forms the abutment for the pressing member. The cylinder is for instance hinged to the structure, and the rod forms a constraint defining an abutment for the pressing member. The abutment can cooperate, for instance, with a side support arm of the pressing member. The pressing member can be a roller, for example. Other configurations of the pressing member are also possible. The pressing member can comprise, for instance, a flexible element such as a belt. This flexible element can be driven around two guiding rollers. The unit thus formed can be pushed against the corrugating roller and against the abutment(s) associated with the pressure chamber.

Abutment means a generic constraint generating a reaction force counterbalancing the thrust exerted by the pressing member. The abutment preferably generates a constraining force in one direction but not in the opposite direction, allowing a movement of the pressing member upward and away from the corrugating roller. Generally it is sufficient that this movement is limited, in the order of some millimeters or centimeters, and its aim is to avoid overstresses for instance when a web material portion with greater thickness (due to a manufacturing defect of the web material or caused by a splicing area between two subsequent web materials) passes between the pressing member and the corrugating roller.

In some embodiments the hydraulic circuit comprises a pump, to the discharge of which a regulating valve is associated, a discharge pressure transducer being associated to said regulating valve, to detect the outlet pressure of said regulating valve, said pump being connectable with said first pressure chamber through said regulating valve. Such a pump can feed pressure liquid into, or discharge the excess liquid from, the pressure chamber. In general, the direction of the liquid flow depends on the kind of adjustment required. In some embodiments, to increase the pressure force exerted by the pressing member against the corrugating roller the liquid quantity in the pressure chamber must be reduced, thus decreasing the pressure in said chamber and therefore the constraining force exerted on the pressing member by the abutment associated with the pressure chamber. This corresponds to a displacement of the pressing member and an increase in the pressure exerted thereby against the corrugating roller.

If the pressure chamber and the abutment are designed as thrust constraints on the pressing member, the reduction in the pressure chamber volume entails a pressure increase on the web material. They can also be configured as traction members; in this case a decrease in the pressure chamber volume entails a decrease in the pressure on the web material.

In general, if an increase in the pressure chamber volume entails a reduction in the pressure on the web material, then a reduction in the pressure chamber volume entails vice versa an increase in the pressure on the web material.

According to advantageous embodiments the regulating valve is a proportioning valve interfaced to the discharge pressure transducer. The regulating valve is controlled by a control unit according to the transducer signal.

In preferred embodiments of the invention, the first stop valve is controlled so as to open when the outlet pressure of said regulating valve is substantially equal to the pressure detected by said first pressure transducer. In this way the regulating cycle starts without kickbacks on the pressing member. In fact, the first step of the regulating cycle brings the inlet pressure into the pressure chamber to the same value existing inside the pressure chamber. Only at a later time the pressure chamber is put into fluid connection with the hydraulic circuit and the discharge pressure downstream of the regulating valve is set or adjusted so as to cause an increase or a decrease in the liquid volume in the pressure chamber and therefore in the volume of said chamber, with subsequent adjustment of the pressure exerted by the pressing member on the web material driven around the second corrugated roller.

In some embodiments the outlet pressure from the regulating valve is adjusted after opening of the regulating valve so as to create a difference between the pressure detected in the pressure chamber and the outlet pressure from the regulating valve, to generate an inlet or outlet flow of pressure liquid into or from the first pressure chamber so as to cause an adjustment of the pressure in said first pressure chamber until a desired value is achieved.

As it may be necessary to adjust the constraining force on two opposite ends of the pressing member of the two sides of the machine independently, the pressure regulating systems comprises, in some embodiments, a first and a second pressure chambers, each of which is associated with a respective first and second abutment for the pressing member. The two pressure chambers are connected with a hydraulic circuit so that both of them perform the same regulation.

In some embodiments the whole hydraulic circuit is double, and provides for a first pump for the first pressure chamber and for a second pump for the second pressure chamber, with respective first and second regulating valve, each of which is associated with a discharge pressure transducer.

In simpler and more economical embodiments, the first and the second pressure chamber are preferably connected, through two stop valves controlled independently of each other, with a common hydraulic circuit comprising only one pump, with a regulating valve and a discharge pressure transducer associated with the regulating valve.

In this case a control unit is preferably programmed to perform two sequential adjustments, if necessary. In some cases the adjustment of only one abutment, and not of the other, may be however required. In this case the volume of a pressure chamber is adjusted while the other remains unchanged.

According to a different aspect the invention relates to a method for adjusting the contact pressure between a corrugating roller and a pressing member in a corrugating machine for producing corrugated board, wherein said pressing member is urged against at least a first abutment defined by a first pressure chamber, comprising the steps of: maintaining said pressure chamber closed and insulated from a hydraulic circuit; detecting the pressure inside said pressure chamber; when the detected pressure is outside an acceptable range around a desired value, thus putting said first pressure chamber into communication with said hydraulic circuit and modifying the volume of liquid in said first pressure chamber until a desired pressure is achieved.

In some preferred embodiments of the invention the method comprises the following steps: when the pressure detected in said first pressure chamber is outside an acceptable range, actuating a pump for feeding pressure liquid; adjusting a liquid discharge pressure from a regulating valve arranged between said pump and said first pressure chamber; when the discharge pressure of said regulating valve is substantially equal to the pressure detected in said first pressure chamber, putting said pressure chamber into fluid communication with said regulating valve; adjusting the discharge pressure of the regulating valve at a greater or lower value than the detected pressure in said first pressure chamber to increase or decrease in a controlled manner the volume of liquid in said first pressure chamber and consequently to modify the pressure in said first pressure chamber; insulating said first pressure chamber from said regulating valve when the pressure inside said first pressure chamber has achieved a desired value.

Further features and embodiments of the invention are described below.

BRIEF DESCRIPTION OF THE DRAWINGS

The invention will be better understood by the description below and the attached drawing, which shows a non-limiting practical embodiment of the invention. More in particular, in the drawing.

DETAILED DESCRIPTION OF AN EMBODIMENT OF THE INVENTION

Figure 1:
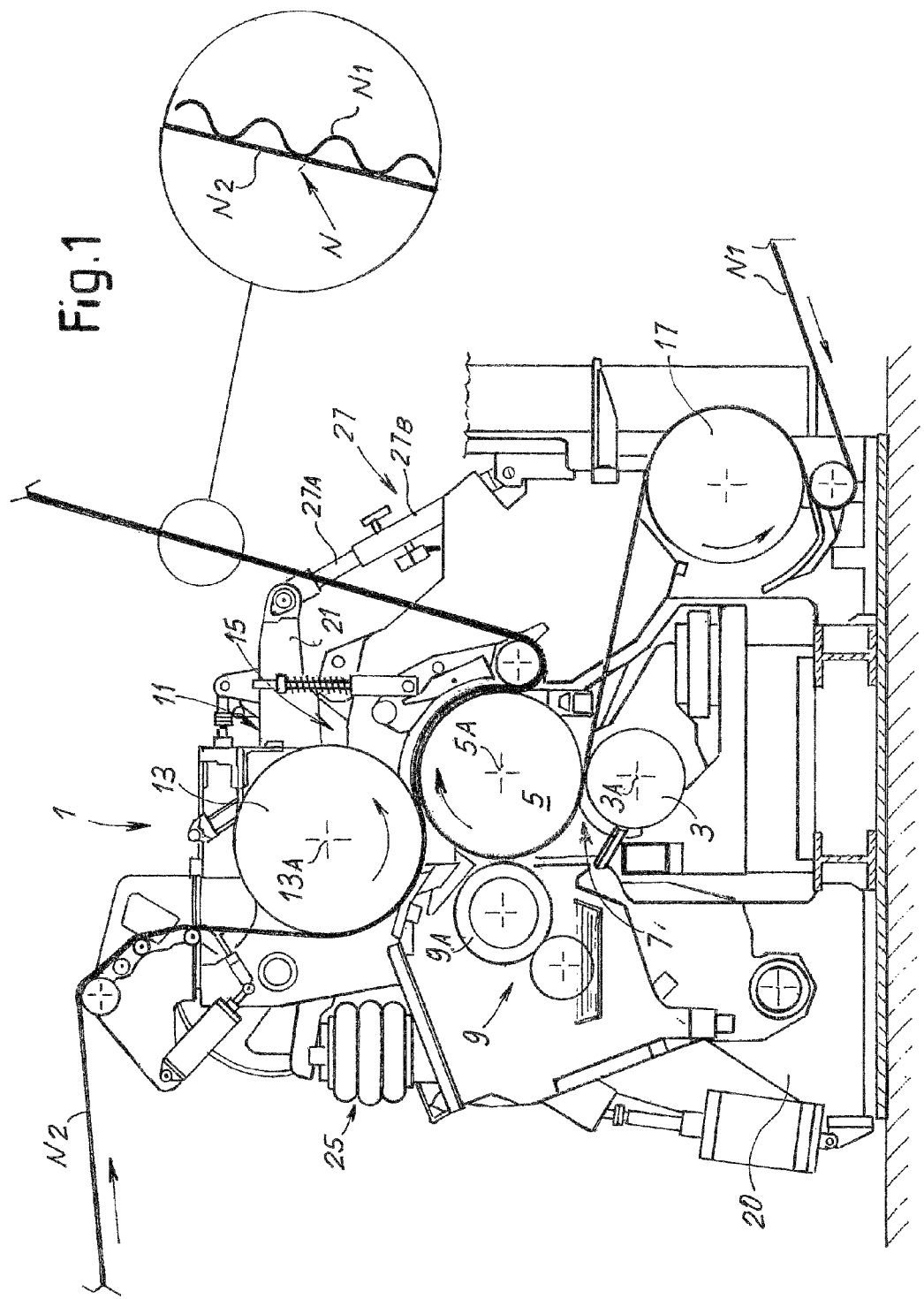
FIG. 1 shows a schematic side view of a corrugating machine according to the invention.

FIG. 1 schematically shows a side view of a corrugating machine, or so-called single facer, to which the invention is applied. The machine is indicated as a whole with the number 1. It comprises a first corrugating roller 3, whose cylindrical surface is provided with flutes engaging with corresponding flutes provided on the cylindrical surface of a second corrugating roller 5. The corrugating rollers can be designed for instance as described in the document US 2007/0248712, the content of which is incorporated in the present description by reference for further details.

Between the rollers 3 and 5 a corrugating nip 7 is defined, through which the web material N1, typically a continuous paper sheet with adequate grammage, passes. Passing in the corrugating nip in a known manner, the web material N1 is deformed permanently due to the meshing of the flutes of the corrugating rollers 3 and 5.

A gluing unit, indicated as a whole with number 9, cooperates with the second corrugating roller 5. Through an applicator roller 9A, this unit applies glue on the crests of the corrugated web material N1 while this latter is still engaged on the corrugated surface of the second corrugating roller 5.

A pressing member, indicated as a whole with number 11, cooperates with the second corrugating roller 5. In the illustrated embodiment the pressing member 11 comprises a pressing roller 13 arranged with the rotation axis 13A thereof substantially parallel to the rotation axis 5A of the second corrugating roller 5 and to the rotation axis 3A of the first corrugating roller 3. A laminating nip 15 is defined between the second corrugating roller 5 and the pressing roller 13. The first web material N1, on the crests of which the unit 9 has applied the glue, and a second web material N2 driven around the pressing roller 13 pass across this nip.

The pressure exerted by the pressing roller 13 against the crests or flutes of the second corrugating roller 5, together with the heat supplied as described below, causes glue desiccation and consequently reciprocal adhesion of the web materials N1 and N2 at the crests of the web material N1. The heat that, together with the pressure, allows gluing, is supplied through a heat-transferring fluid circulating in at least one of the two rollers 13 and 5 and preferably in both said rollers. The heat-transferring fluid can be diathermal oil, or preferably steam, or any other adequate fluid able to transfer heat to the cylindrical jacket of the rollers 5 and 13. Pre-heating systems for the first web material N1 and/or for the second web material N2 can be provided for better gluing. In the embodiment illustrated in FIG. 1 a pre-heating roller 17 is provided along the path of the first web material N1. A similar pre-heating roller can be provided along the path of the web material N2 upstream of the pressing roller 13.

The structure described above is traditional and known to those skilled in the art.

Figure 2:
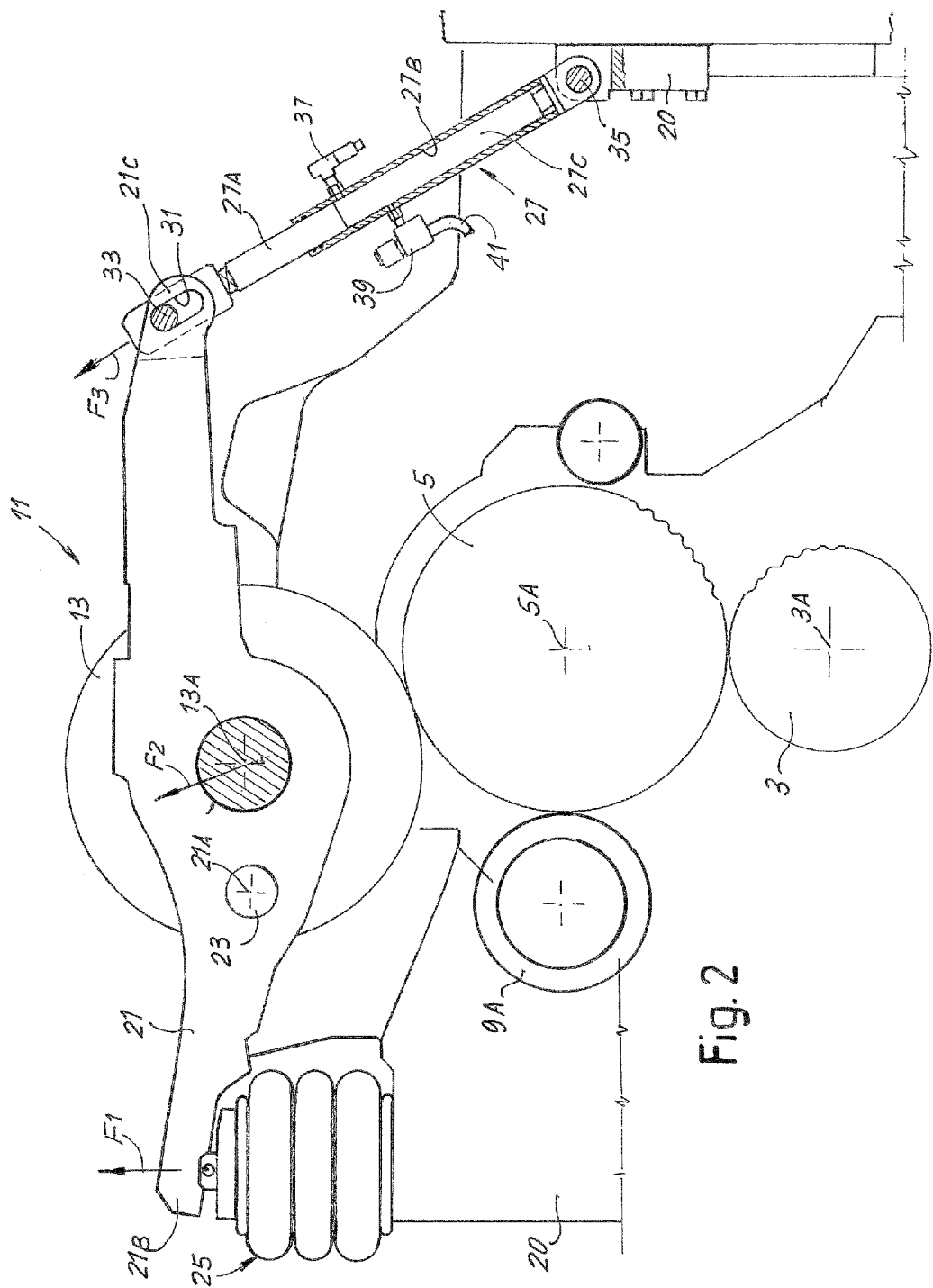
FIG. 2 shows an enlargement of some elements of the corrugating machine of FIG. 1.

With reference to FIG. 1 again and also to FIG. 2, the elements used to push the pressing roller 13 of the pressing member 11 against the crests or flutes of the second corrugating roller 5 will be described below in greater detail. To this end, in some embodiments the pressing roller 13 is supported at its own ends by a pair of arms 21, only one of which is illustrated in FIGS. 1 and 2, the other being substantially symmetrical. The arms 21 are hinged around pins 23 integral with the machine bearing structure 20. In some embodiments the arms are independent of each other. 21A indicates the rotation or pivoting axis of the arms 21. The axis 21A is substantially parallel to the axis 13A of the pressing roller 13 and to the axes 5A and 3A of the first and of the second corrugating roller respectively.

At least one actuator is associated with the pressing roller 13, generating a thrust of the pressing roller 13 against the corrugating roller 5. Two actuators are preferably provided, one for each arm 21, driving the respective arm 21 into rotation around the axis 21A of the pin 23. FIGS. 1 and 2 show one of these actuators, indicated with 25. In some embodiments the actuators can be constituted by a so-called torpress. In other embodiments different types of actuators can be used. Even if it would be desirable to have available two independent actuators for the two arms 21, it is however also possible to provide a single actuator for both the arms 21, for example by joining the arms together by means of a torsion bar.

The actuator, or each actuator 25 acts on the respective arm 21 at a first end 21B thereof. The opposite end 21C of the arm 21 is fixed to a cylinder-piston actuator 27. In an advantageous embodiment, the connection between the end 21C of the arm 21 and the cylinder-piston actuator 27 is made by a slot 31 provided in the arm 21 near the end 21C, and a pin 33, integral with a rod 27A of the cylinder-piston actuator 27, engaging in this slot. This connection allows a relative movement between the arm 21 and the cylinder-piston actuator 27 and, substantially, it produces a simple rest for the arm 21 on the rod 27A of the cylinder-piston actuator 27.

The rod 27A slides inside a cylinder 27B defining a pressure chamber 27C filled with a pressure fluid, typically a liquid, in particular for instance an oil. Advantageously the pressure fluid is a substantially incompressible fluid, and therefore substantially any liquid compatible with the material of which the cylinder-piston actuator and the corresponding seals, as well as the hydraulic liquid adduction conduits, are made.

The pressure chamber 27C, formed in this exemplary embodiment by the cylinder 27B and the rod 27A, can be also designed in a different manner. In general, it will be a variable volume chamber, whose volume change entails a position change of the abutment associated with the pressure chamber and therefore a change in the constraining force exerted on the arm 21.

The cylinder-piston actuator 27 is fixed, to the machine rigid structure, indicated as a whole with number 20 not only through the slots 31 and the pin 33 at the end 21C of the arm 21, but also through a pin 35 at the opposite end.

The pressure chamber 27C is advantageously associated with a pressure transducer 37, detecting the pressure of the pressure fluid inside the pressure chamber 27C. Through an electronically controlled valve 39 the pressure chamber 27 is furthermore connected with a pressurized fluid feed duct 41 connecting the valve 39, and therefore the chamber 27C, with a hydraulic circuit that will be described in greater detail below with reference to FIG. 3.

Figure 3:
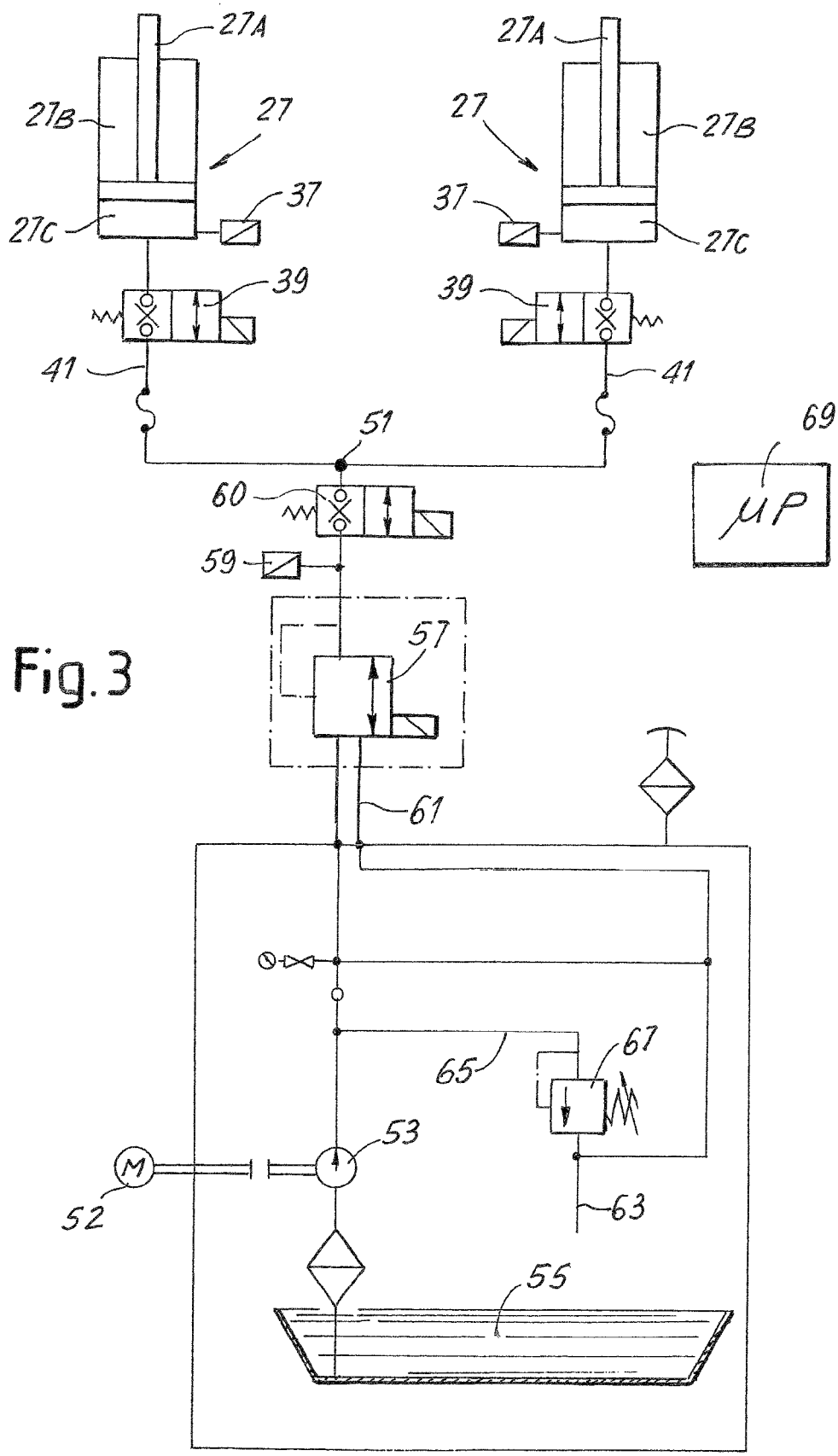
FIG. 3 shows a diagram of the hydraulic circuit for regulating the pressure of the pressing member against the second corrugating roller.

FIG. 3 shows the diagram of the hydraulic circuit comprising two cylinder-piston actuators 27 forming two pressure chambers 27C, one for each of the arms 21. The diagram of FIG. 3 shows also two stop valves 39 connected, through respective ducts 41, with a common connection 51, through which the two ducts 41 are connected with a pump 53 drawing the pressure liquid from a tank 55. The pump 53 is joined to the connection 51 through a segment comprising a regulating valve, for example a proportioning valve 57, and a discharge pressure transducer 59 arranged at the exit side of the valve 57.

In some embodiments a further stop valve 60 is furthermore provided between the proportioning valve 57 and the connection 51.

The proportioning valve 57 is connected not only to the discharge duct of the pump 53 and to the outlet toward the connection 51, but also to a recycling duct 61 allowing discharge of the liquid, sucked by the pump 53 through the proportioning valve 57, towards the tank 55. To the outlet 63, to which the duct 61 coming from the proportioning valve 57 is connected, a discharge branch 65 of the pump 53 is also connected, on which a pressure limiting valve 67 is arranged. 52 indicates the actuating motor for the pump 53.

In the diagram of FIG. 3 also a central control unit is schematically indicated with the number 69, connected to the transducers and to the electronically controlled valves of the circuit.

With reference to FIG. 2 again, it should be noted that when the actuator 25 operates, it exerts a thrust indicated with F1 on the end 21B of the corresponding arm 21. This is therefore driven to pivot around the axis 21A to press against the pressing roller 5. F2 indicates the resultant of the reaction forces on the corresponding support of the pressing roller 13 resulting from the thrust it exerts on the second corrugating roller 5 below. F3 indicates the reaction force exerted by the rod 27A on the end 21C of the arm 21.

As the system must be in equilibrium, the moments of the forces F2 and F3 relative to the pivoting axis 21A must balance the moment of the force F1. The distribution of the forces F1, F2, and F3 is changed by changing the position of the abutment formed by the rods 27A, through elongation and shortening of the cylinder-piston actuator 27, and thus through change in the volume of the pressure chamber 27C. Acting on the dimension of the pressure chamber 27C it is therefore possible, with the same force F1, to modify the force F2 exerted by the pressing roller 13 on the second corrugating roller 5. The force F3 is proportional to the inner pressure of the pressure chamber 27C of the cylinder-piston actuator 27, the pressure being detected by the pressure transducer 37.

By means of the pressure regulating system, comprising the two cylinder-piston actuators 27 and the corresponding hydraulic circuit, it is therefore possible to adjust the pressure exerted by the pressing roller 13 against the corrugating roller 5 and therefore on the pair of web material N1, N2. The pressure is adjusted as follows.

A change in the arrangement of the pressing member 11 may become necessary for example due to variations in the thickness of one or the other of the two web materials N1, N2, even in the same batch. In other cases, it could be necessary to modify the pressure due to changes in the operating conditions, for instance a change in the glue consistency, the rollers temperatures, the ambient temperature or the like, the temperature being able to cause dimensional variations in the various machine members.

Under stable operating conditions, the pressure with which the web materials N1, N2 are pressed against each other in the laminating nip between the pressing roller 13 and the corrugating roller 5 is constant. This pressure is usually set at a desired value and it must be maintained around this value within a tolerance range.

As mentioned above, a pressure in the pressure chamber 27C of the cylinder-piston actuators 27 corresponds to a given force F2, with which the roller 13 presses against the roller 5. The two pressure transducers 37 detect the pressure in the two pressure chambers 27C. When the pressure inside one or the other of the two cylinder-piston actuators 27 changes and goes outside the set tolerance range it is necessary to adjust or regulate the pressure. These variations can result for instance from a change in the thickness of one or the other of the two web materials N1, N2, or from a change in the dimensions of one or the other or both the rollers 13 and 5 due to thermal expansion. Other factors can affect the change in the laminating pressure, for example the expansion of other machine members or a change in the pressure with which the actuators 25 push the arms 21, and therefore the pressing roller 13, against the corrugating roller 5.

When one or the other or both the transducers 27 detect a change in the pressure of the pressure fluid inside the respective pressure chamber 27C outside the upper or lower value of the tolerance range, the adjustment occurs as follows.

Let it be supposed that the pressure in both the pressure chambers 27C of the cylinder-piston actuators 27 must be adjusted. The adjustment preferably occurs sequentially, firstly for one and then for the other of the two cylinder-piston actuators, and the operating sequence can start from one or the other of the two cylinder-piston actuators indifferently, or can be set based on the change in the detected pressure relative to the desired pressure.

Starting from one or the other of the two cylinder-piston actuators 27, the pump 53 is actuated under the control of the central unit 69, and starts to feed the pressure liquid into the proportioning valve 57. Through the signal given by the discharge pressure transducer 59, this proportioning valve 57 is adjusted so as to obtain an outlet pressure which is substantially equal to the inner pressure of the pressure chamber 27C of the cylinder-piston actuator 27 being regulated, based upon the signal generated by the pressure transducer 37 associated with the cylinder-piston 27. Until these pressures are not equal, the liquid pumped by the pump 53 is discharged from the proportioning valve 57 through the duct 61 towards the tank 55.

Once the two above mentioned pressures have become equal, the stop valve 39 is opened. This does not affect the arm 21 to which the cylinder-piston 27 is connected, as the two pressures, downstream of the valve 57 and inside the pressure chamber 27C, are the same. To set the pressure in the chamber 27C to the desired value again, the proportioning valve 57 is adjusted so as to have an outlet pressure, detected by the transducer 59, which is higher or lower by a preset quantity than the inner pressure of the chamber 27C.

For instance, if the adjustment requires an increase in the pressure inside the pressure chamber 27C, and therefore a reduction in the pressure exerted by the pressing roller 13 on the corrugating roller 5, the discharge pressure of the proportioning valve 57 will be set at a greater value than that of the pressure chamber 27C, imposing a preset pressure difference. Consequently, a pressure liquid flow generates from the pump 53 and the proportioning valve 57 inside the pressure chamber 27C. As the pressure transducer 37 associated with the pressure chamber 27C detects the pressure desired value inside the chamber, the central unit 69 closes the stop valve 39, intercepting the pressure liquid flow and therefore fixing the liquid volume inside the pressure chamber 27C. An opposite operation occurs if the pressure inside the chamber 27C must be reduced. In this case, the pressure downstream of the proportioning valve 57 is reduced by a preset quantity, to generate a pressure liquid flow from the pressure chamber 27C towards the discharge 61. The set pressure difference can be very small, for instance in the order of a fraction of bar. This allows a very fine adjustment. In some cases, if it is necessary to impose significant pressure changes, regulations can be made in two steps: a first coarse step, imposing a relatively high pressure difference between discharge of the proportioning valve 57 and pressure chamber 27C; a second step follows, with a lower pressure difference.

As the liquid is substantially incompressible, when the stop valve 39 is closed the cylinder-piston actuator 27 substantially acts as a rigid abutment, notwithstanding a smallest compressibility degree of the liquid. Once the adjustment has been performed in one of the two pressure chambers 27C, the control system start to adjust pressure inside the other pressure chamber 27C of the opposite arm 21 with a procedure equal to that described.

It is also possible to provide two completely independent hydraulic circuits for the two cylinder-piston actuators 27, with two pumps, two proportioning valves 57 and two discharge pressure transducers 59 at the output side of the respective valve 57 and pump 53, so as to adjust simultaneously the pressure for both the cylinder-piston actuators 27. One single pump can be also provided, with two proportioning valves 57 and two discharge pressure transducers 59.

These designs are however more expensive as regards construction and control, even if they allow to adapt the system more quickly and prompt to regulate the pressure exerted by the pressure roller 13 against the corrugating roller 5.

It should be understood from the description above that the regulating system according to the present invention allows to adjust the pressure through a substantially incompressible fluid system, which acts, when the pressure has been set correctly, as a substantially rigid abutment. This allows on one hand to suit to the working condition, bringing the laminating pressure of the web material to the desired value in case of oscillations, with a extremely stable regulating ring, and on the other hand to change the pressure force for example based upon an operator's control.

Coupling the arm 21 and the respective cylinder-piston actuator 27 through the pin 33 sliding in the slot 31 allows the system to withstand for instance a sudden change in the thickness of the web material passing across the laminating nip, due for example to the passage in a splicing area in correspondence of the tail of a web material and the head of the subsequent web material. In this case the web material thickness quickly doubles This is a transitory condition that does not require a regulating system intervention, but it is necessary that the pressing roller 13 moves and allows the passage of this area of material with greater thickness without damaging the system. Coupling between the slot 31 and the pin 33 allows to achieve this result, thanks to the fact that, when a thicker area of the web material passes, each arm 21 can move away from the corrugating roller 5 winning the thrust F1 of the actuator 25.

It is understood that the drawing only shows an example provided by way of a practical arrangement of the invention, which can vary in forms and arrangements without however departing from the scope of the concept underlying the invention. Any reference numbers in the appended claims are provided for the sole purpose of facilitating reading of the claims in the light of the description and the drawing, and do not in any manner limit the scope of protection represented by the claims.

What is claimed is:

1. A machine for producing a corrugated board, comprising:
    a first corrugating roller and a second corrugating roller defining a corrugating nip through which a first web material passes;
    a gluing unit cooperating with said second corrugating roller to apply a glue on crests of said first web material formed in said corrugating nip;
    a pressing member cooperating with said second corrugating roller to press a second web material against the crests of the first web material;
    a pressure regulating system to adjust the pressure of the pressing member against said second corrugating roller, said pressure regulating system comprising at least a first pressure chamber associated with a first abutment for said pressing member, said pressure chamber containing a pressure liquid and being provided with a first pressure transducer to detect the pressure inside said first pressure chamber, wherein a control unit causes controlled opening of a first stop valve when the pressure detected by said first pressure transducer is outside a tolerance range around a desired pressure value, the opening of said first stop valve putting the first pressure chamber into fluid connection with a hydraulic circuit for pumping the pressure liquid.

2. A machine as claimed in claim 1, wherein said hydraulic circuit comprises a pump, to the discharge whereof a regulating valve is associated, a discharge pressure transducer being associated to said regulating valve, to detect the outlet pressure of said regulating valve, said pump being connectable with said first pressure chamber through said regulating valve.

3. A machine as claimed in claim 2, wherein said regulating valve is a proportioning valve interfaced to said discharge pressure transducer.

4. A machine as claimed in claim 2, wherein said first stop valve is controlled so as to open when the outlet pressure of said regulating valve is substantially equal to the pressure detected by said first pressure transducer.

5. A machine as claimed in claim 2, wherein the outlet pressure from said regulating valve is adjusted after opening of the regulating valve so as to create a difference between the pressure detected in said first pressure chamber and the outlet pressure from said regulating valve, to generate an inlet or outlet flow of pressure liquid into or from said first pressure chamber so as to cause an adjustment of the pressure in said first pressure chamber until a desired value is achieved.

6. A machine as claimed in claim 1, wherein said pressure regulating system comprises at least a second pressure chamber associated with a second abutment for said pressing member, said second pressure chamber containing a pressure liquid and being provided with a second pressure transducer to detect the pressure inside said second pressure chamber, said control unit causin the controlled opening of a second stop valve when the pressure detected by said second pressure transducer is outside a tolerance range around a desired pressure value, the opening of said second stop valve putting the second pressure chamber into connection with said hydraulic circuit for pumping the pressure liquid.

7. A machine as claimed in claim 6, wherein said second stop valve is controlled so as to open when the outlet pressure of said regulating valve is substantially equal to the pressure detected by said second pressure transducer.

8. A machine as claimed in claim 7, wherein the outlet pressure from said regulating valve is adjusted so as to create a difference between the pressure detected in said second pressure chamber and the outlet pressure from said regulating valve, to generate an inlet or outlet flow of pressure liquid into or from the second pressure chamber so as to cause an adjustment of the pressure in said second pressure chamber until a desired value is achieved.

9. A machine as claimed in claim 6, wherein said control unit is programmed so as to adjust the pressure sequentially in said first pressure chamber and in said second pressure chamber.

10. A machine as claimed in claim 6, wherein said first pressure chamber and said second pressure chamber are associated with two ends of said pressing member.

11. A machine as claimed in claim 6, wherein said first pressure chamber is defined by a first cylinder-piston actuator.

12. A machine as claimed at least in claim 6, wherein said second pressure chamber is defined by a second cylinder-piston actuator.

13. A machine as claimed in claim 11, wherein said pressing member and said first cylinder-piston actuator are connected to each other through said first abutment so as to allow said pressing member to move away from the second corrugating roller.

14. A machine as claimed in claim 6, wherein said pressing member comprises a pressing roller supported by at least a first arm hinged around a support axis parallel to the axis of said pressing roller, and said first arm cooperates with the first abutment formed by said first cylinder-piston actuator.

15. A machine as claimed in claim 6, wherein said pressing member comprises a pressing roller supported by at least a first arm hinged around a support axis parallel to the axis of said pressing roller, and said first arm cooperates with the first abutment formed by said first cylinder-piston actuator, and said pressing roller is supported by said first arm and by a second arm cooperating with the second abutment associated with the second pressure chamber.

16. A machine as claimed in claim 14, further comprising at least one thrust actuator acting on one end of said first arm to push said first arm against said first abutment and the pressing roller against the second corrugating roller.

17. A machine as claimed in claim 15, further comprising:
- at least one thrust actuator acting on one end of said first arm to push said first arm against said first abutment and the pressing roller against the second corrugating roller; and
- a second thrust actuator acting on one end of said second arm to push said second arm against said second abutment.

18. A method for adjusting the contact pressure between a corrugating roller and a pressing member in a corrugating machine for producing corrugated board, wherein said pressing member is urged against at least one first abutment defined by a first pressure chamber, the method comprising the steps of:
- maintaining said pressure chamber closed and insulated from a hydraulic circuit;
- detecting the pressure inside said pressure chamber;
- when the detected pressure is outside an acceptable range around a desired value, putting said first pressure chamber into communication with said hydraulic circuit and modifying the volume of liquid in said first pressure chamber until a desired pressure is achieved.

19. A method as claimed in claim 18, further comprising the following steps:
- when the pressure detected in said first pressure chamber is outside an acceptable range, actuating a pump for feeding pressure liquid;
- adjusting a liquid discharge pressure from a regulating valve arranged between said pump and said first pressure chamber;
- when the discharge pressure of said regulating valve is substantially equal to the pressure detected in said first pressure chamber, putting said first pressure chamber into fluid communication with said regulating valve;
- adjusting the discharge pressure of the regulating valve at a greater or lower value than the detected pressure in said first pressure chamber to increase or decrease in a controlled manner the volume of liquid in said first pressure chamber and consequently to modify the pressure in said first pressure chamber;
- when the pressure in said first pressure chamber has achieved a desired value, interrupting the fluid connection between said first pressure chamber and said regulating valve.

* * * * *